United States Patent
Loveland et al.

(10) Patent No.: US 9,108,628 B2
(45) Date of Patent: Aug. 18, 2015

(54) TURBO COMPOUNDING HYBRID GENERATOR POWERTRAIN

(75) Inventors: Dustin Loveland, Holly, MI (US); Jason G. Kohler, Waterford, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 438 days.

(21) Appl. No.: 13/600,577

(22) Filed: Aug. 31, 2012

(65) Prior Publication Data

US 2014/0060045 A1 Mar. 6, 2014

(51) Int. Cl.
| | |
|---|---|
| F02G 3/00 | (2006.01) |
| F02D 23/00 | (2006.01) |
| F02B 33/44 | (2006.01) |
| B60W 10/26 | (2006.01) |
| B60W 20/00 | (2006.01) |
| B60W 10/06 | (2006.01) |
| F02N 11/08 | (2006.01) |
| F02B 37/18 | (2006.01) |

(52) U.S. Cl.
CPC .............. B60W 10/26 (2013.01); B60W 10/06 (2013.01); B60W 20/106 (2013.01); B60W 2510/244 (2013.01); B60Y 2400/435 (2013.01); F02B 37/18 (2013.01); F02N 11/0818 (2013.01); Y02T 10/163 (2013.01)

(58) Field of Classification Search
CPC ........... F02B 41/10; F02B 37/18; F02B 37/00
USPC ............................ 60/614, 624, 607–609, 602
See application file for complete search history.

(56) References Cited

U.S. PATENT DOCUMENTS

| | | | | | |
|---|---|---|---|---|---|
| 4,748,812 | A | * | 6/1988 | Okada et al. | 60/614 |
| 4,800,726 | A | * | 1/1989 | Okada et al. | 60/614 |
| 4,843,822 | A | * | 7/1989 | Okada | 60/614 |
| 5,119,633 | A | * | 6/1992 | Brooks et al. | 60/624 |
| 5,357,927 | A | * | 10/1994 | Saito et al. | 123/406.54 |
| 5,390,640 | A | * | 2/1995 | Saito et al. | 123/179.16 |
| 5,402,763 | A | * | 4/1995 | Saito et al. | 123/179.21 |
| 7,347,048 | B2 | * | 3/2008 | Albat | 60/624 |
| 7,398,650 | B2 | * | 7/2008 | Bottcher et al. | 60/624 |
| 7,434,389 | B2 | * | 10/2008 | Robel | 60/303 |
| 7,797,938 | B2 | * | 9/2010 | Ruiz | 60/614 |
| 2014/0208745 | A1 | * | 7/2014 | Suhocki et al. | 60/611 |

FOREIGN PATENT DOCUMENTS

| | | | | | |
|---|---|---|---|---|---|
| JP | 08240156 | A | * | 9/1996 | F02B 41/10 |
| JP | 10339156 | A | * | 12/1998 | F02B 41/10 |
| JP | 2000179348 | A | * | 6/2000 | F02B 41/10 |

* cited by examiner

*Primary Examiner* — Thai Ba Trieu
(74) *Attorney, Agent, or Firm* — Cantor Colburn LLP

(57) ABSTRACT

A turbo compounding internal combustion engine system includes an internal combustion engine and one or more valves for controlling a flow of an exhaust gas of the internal combustion engine. The system also includes a controller configured to monitor an operation mode of the internal combustion engine and responsively control the one or more valves and a turbine configured to selectively receive the exhaust gas from the internal combustion engine and to convert exhaust energy into a mechanical power. The system further includes a clutched gear drive selectively coupled to the turbine and the internal combustion engine, wherein the clutched gear drive is configured to provide the mechanical power generated by the turbine to the internal combustion engine.

13 Claims, 3 Drawing Sheets

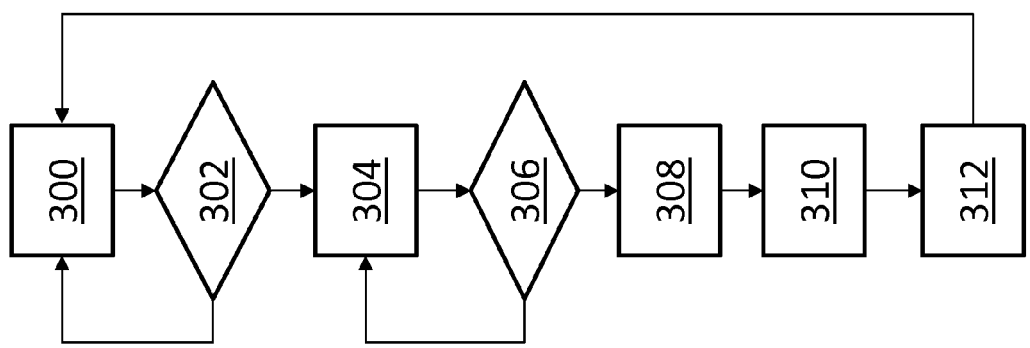

TURBO COMPOUNDING HYBRID GENERATOR POWERTRAIN

FIELD OF THE INVENTION

The subject invention relates generally to systems and methods for providing power to a vehicle, and more specifically to a hybrid powertrain system utilizing turbo compounding.

BACKGROUND

Typical hybrid powertrain systems utilize a combination of an internal combustion engine and an electric engine to provide power to a vehicle. Depending upon the configuration of the powertrain, the internal combustion engine may be configured to provide power directly to the vehicle or the internal combustion engine may be configured to charge a battery used by the electric motor.

Internal combustion engines are well known in the art and operate by burning fuel to create mechanical energy. The efficiency of the combustion of the fuel is measured by the thermal efficiency of the engine. Two types of thermal efficiency are generally considered for an engine, the indicated thermal efficiency and the brake thermal efficiency. The indicated thermal efficiency is determined by the work done by the gases in an engine cylinder and the brake thermal efficiency is determined by the work done at the output shaft of the engine.

During operation of traditional internal combustion engines, approximately between twenty-five and thirty-five percent of the fuel energy leaves the engine in the form of exhaust enthalpy, or wasted energy in the exhaust gas. Accordingly, what is needed are methods and systems for improving the brake thermal efficiency of internal combustion engines in hybrid powertrain systems by reducing the energy lost in the form of exhaust enthalpy.

SUMMARY OF THE INVENTION

In one exemplary embodiment, a turbo compounding internal combustion engine system includes an internal combustion engine and one or more valves for controlling a flow of an exhaust gas of the internal combustion engine. The system also includes a controller configured to monitor an operation mode of the internal combustion engine and responsively control the one or more valves and a turbine configured to selectively receive the exhaust gas from the internal combustion engine and to convert exhaust energy into a mechanical power. The system further includes a clutched gear drive selectively coupled to the turbine and the internal combustion engine, wherein the clutched gear drive is configured to provide the mechanical power generated by the turbine to the internal combustion engine.

In another exemplary embodiment, a method for operating a turbo compounding hybrid generator powertrain system includes monitoring a voltage of a battery by a controller and determining if the voltage of the battery is below a minimum threshold value. Based on determining that the voltage level is below the minimum threshold value, the method includes activating an internal combustion engine and monitoring the voltage of the battery and an operational state of the internal combustion engine. The method also includes determining if the operational state of the internal combustion engine is a steady state charging mode. Based on determining that the operational state of the internal combustion engine is a steady state charging mode, the method further includes configuring one or more valves to provide exhaust gas from the internal combustion engine to a turbine. Based on determining that the operational state of the internal combustion engine is not the steady state charging mode, the method also includes continuing to monitor the voltage of the battery and the operational state of the internal combustion engine.

In yet another exemplary embodiment, a turbo compounding hybrid generator powertrain system includes an internal combustion engine system coupled to a generator, wherein the generator is configured to charge a battery and an electric motor configured to draw electrical power from the battery and provide mechanical power to a drive system. The turbo compounding hybrid generator powertrain system also includes a controller configured to monitor a voltage level of the battery and responsively operate the internal combustion engine system and electric motor. The internal combustion engine system includes an internal combustion engine and one or more valves operated by the controller for controlling the flow of exhaust gas from the internal combustion engine. The internal combustion engine system also includes a turbine configured to selectively receive the exhaust gas from the internal combustion engine and to convert an exhaust energy into a mechanical power and a clutched gear drive coupled to the turbine and the internal combustion engine, wherein the clutched gear drive is configured to provide the mechanical power generated by the turbine to the internal combustion engine. When the internal combustion engine is operating in a steady state charging mode, the controller directs the flow of the exhaust gas to the turbine. When the internal combustion engine is not operating in a steady state charging mode, the controller directs the flow of the exhaust gas to bypass the turbine.

The above features and advantages and other features and advantages of the invention are readily apparent from the following detailed description of the invention when taken in connection with the accompanying drawings.

BRIEF DESCRIPTION OF THE DRAWINGS

Other features, advantages and details appear, by way of example only, in the following detailed description of embodiments, the detailed description referring to the drawings in which:

FIG. 3 is a flow diagram of a method for operating a hybrid powertrain having a turbo compounding engine system in accordance with an exemplary embodiment.

DESCRIPTION OF THE EMBODIMENTS

The following description is merely exemplary in nature and is not intended to limit the present disclosure, its application or uses.

Figure 1:
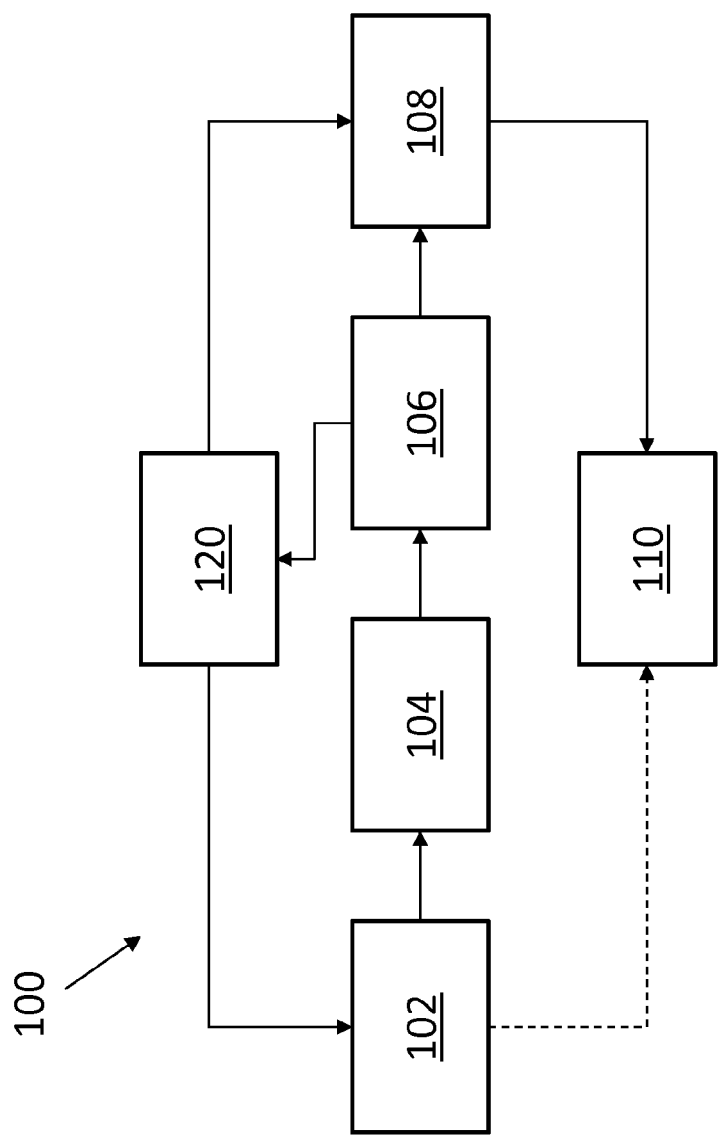
FIG. 1 is a block diagram of a hybrid powertrain for a vehicle in accordance with an exemplary embodiment.

Referring now to FIG. 1, a block diagram of a hybrid powertrain 100 for a vehicle in accordance with an exemplary embodiment is shown. The hybrid powertrain 100 includes an internal combustion engine 102 coupled to a generator 104. In exemplary embodiments, the internal combustion engine 102 may also be selectively coupled to a drive system 110. The generator 104 is coupled to, and configured to charge a battery 106. The hybrid powertrain 100 also includes an electric motor 108 that is connected to and powered by the battery 106 and is coupled to the drive system 110. The hybrid powertrain 100 also includes a controller 120 that is configured to communicate with and control the operation of the internal combustion engine 102 and the electric motor 108 based on the voltage level, or state of charge, of the battery 106.

In exemplary embodiments, the controller 120 of the hybrid powertrain 100 monitors the voltage, of the battery 106 and if the voltage level falls below a minimum threshold value the controller 120 activates the internal combustion engine 102, which via the generator 104 charges the battery 106. Likewise, once the voltage level of the battery 106 is above a maximum threshold value the controller 120 deactivates the internal combustion engine 102. In alternative embodiments, the controller 120 may be used to selectively instruct the internal combustion engine 102 to provide power directly to the drive system 110 based on the voltage level of the battery 106 and/or the power demands of the vehicle.

Figure 2:
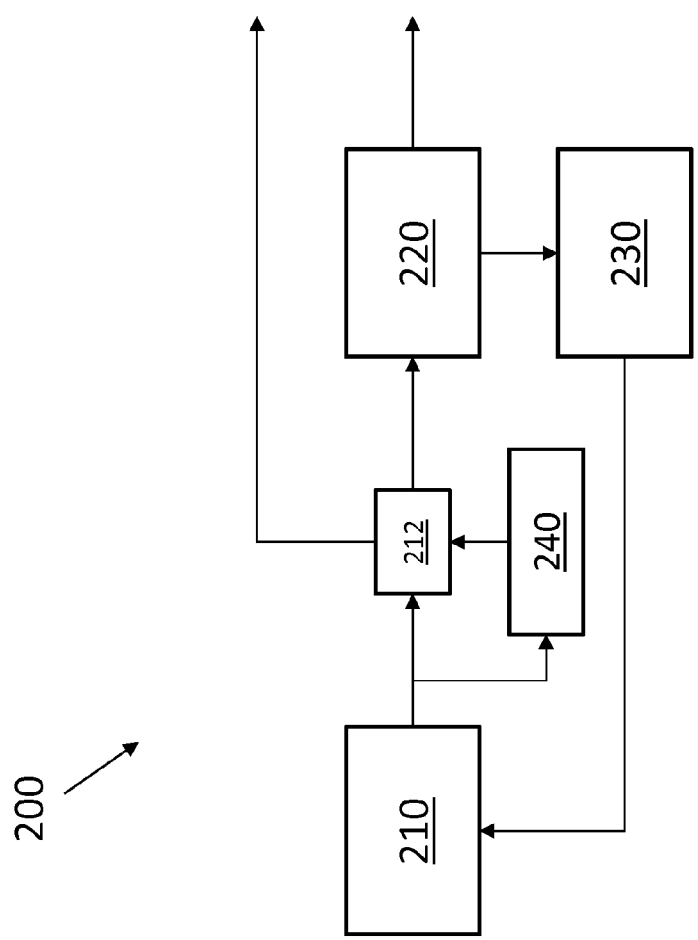
FIG. 2 is a block diagram of an turbo compounding engine system for use in a hybrid powertrain system in accordance with an exemplary embodiment.

Referring now to FIG. 2, a block diagram of a turbo compounding engine system 200 for use in a hybrid powertrain system in accordance with an exemplary embodiment is shown. The turbo compounding engine system 200 includes an internal combustion engine 210, one or more valves 212, a turbine 220, a clutched gear drive 230 and a controller 240. In exemplary embodiments, the exhaust from the internal combustion engine 210 is selectively provided to the turbine 220 by controlling the operation of one or more valves 212. In exemplary embodiments, the controller 240 is configured to open and close valves 212 to control the flow of the exhaust gas from the internal combustion engine 210. The controller 240 may determine to provide all or a portion of the exhaust gas to turbine 220 based on one or more operating conditions of the internal combustion engine 210. For example, the controller 240 may be configured to only provide the exhaust gases to the turbine 220 if the temperature of the internal combustion engine 210 is above a threshold value. In exemplary embodiments, the controller 240 monitors one or more operational characteristics of the internal combustion engine 210 and determines the operational state of the internal combustion engine 210. Once the controller 240 determines that the operational state of the internal combustion engine 210 is a steady state charging mode, the controller 240 configures the one or more valves 212 to provide all of the exhaust from the internal combustion engine 210 to the turbine 220.

In exemplary embodiments, the turbine 220 is configured to convert the exhaust energy into mechanical energy that is provided to the clutched gear drive 230. The clutched gear drive 230 includes a clutch for selectively engaging with the output of the turbine 220 and may also include one or more gears. The clutched gear drive 230 is configured to provide the mechanical power generated by the turbine 220 to the internal combustion engine 210. In exemplary embodiments, the output of the clutched gear drive 230 is provided to the crankshaft of the internal combustion engine 210 through the serpentine drive belt, or front accessory belt. By providing the input to the crankshaft of the internal combustion engine 210 rather than to the rear flex plat or flywheel, gear noise can be reduced and packaging can be simplified.

In exemplary embodiments, the turbine 220 is configured to optimize the amount of energy that it can extract from the exhaust of the internal combustion engine 210 when the internal combustion engine 210 is operating in a steady state charging mode. In exemplary embodiments, the clutched gear drive 230 may use one or more gears to optimize the efficiency of the turbine 220 based upon the operating state of the internal combustion engine 210. The internal combustion engine 210 may operate in an idle state, a steady state charging, and a heating state.

Referring now to FIG. 3, a flow diagram of a method for operating a hybrid powertrain having a turbo compounding engine system in accordance with an exemplary embodiment is shown. At block 300, the method includes monitoring the voltage level of a battery by a controller. Next, at decision block 302, the controller determines if the voltage of the battery is above a minimum threshold value. In exemplary embodiments, the minimum threshold value may be a voltage required to operate the drive system of the vehicle for a predetermined amount of time or to travel a minimum distance. If the voltage level is above the minimum threshold value, the method returns to block 300 and continues to monitor the voltage level of the battery. Otherwise, the method proceeds to block 304 and the controller activates the internal combustion engine and monitors the voltage level of the battery and the operational state of the internal combustion engine. Next, at decision block 306, the controller determines if the internal combustion engine is operating in a steady state charging mode. If the internal combustion engine is not operating in a steady state charging mode, the method proceeds back to block 304 and the controller continues to monitor the voltage level of the battery and the operational state of the internal combustion engine.

Once the controller determines that the internal combustion engine is operating in a steady state charging mode, the method proceeds to block 308 and the controller configures the one or more valves to provide exhaust gas from the internal combustion engine to the turbine. In addition, the controller ensures that the clutched gear drive is engaged with the turbine such that the work output by the turbine is provided to the internal combustion engine. Next, at block 310, the controller continues to monitor the voltage level of the battery and determine if the voltage level of the battery increases to a maximum threshold value. Once the voltage level of the battery increases to a maximum threshold value, the method proceeds to block 312 and the controller deactivates the internal combustion engine.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The flow diagrams depicted herein are just one example. There may be many variations to this diagram or the steps (or operations) described therein without departing from the spirit of the disclosure. For instance, the steps may be performed in a differing order or steps may be added, deleted or modified. All of these variations are considered a part of the claimed disclosure.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the application.

What is claimed is:

1. A turbo compounding internal combustion engine system comprising:
    an internal combustion engine;
    at least one valve for controlling a flow of an exhaust gas of the internal combustion engine;
    a controller configured to monitor an operation mode of the internal combustion engine and responsively control the at least one valve;
    a turbine configured to selectively receive the exhaust gas from the internal combustion engine and to convert an exhaust energy into a mechanical power; and
    a clutched gear drive selectively coupled to the turbine and the internal combustion engine, wherein the clutched gear drive is configured to provide the mechanical power generated by the turbine to the internal combustion engine,
        wherein the controller is further configured to selectively engage the clutched gear drive from the turbine whether the internal combustion engine is operating in a steady state charging mode, or the internal combustion engine is not operating in a steady state charging mode.

2. The turbo compounding internal combustion engine system of claim 1, wherein when the internal combustion engine is operating in the steady state charging mode, the controller adjusts the at least one valve to direct the flow of the exhaust gas to the turbine.

3. The turbo compounding internal combustion engine system of claim 1, wherein when the internal combustion engine is not operating in the steady state charging mode, the controller adjusts the at least one valve to direct the flow of the exhaust gas to bypass the turbine.

4. The turbo compounding internal combustion engine system of claim 1, wherein the controller is further configured to selectively disengage the clutched gear drive from the turbine when the internal combustion engine is not operating in the steady state charging mode.

5. A method for operating a turbo compounding hybrid generator powertrain system, the method comprising:
    monitoring a voltage of a battery by a controller;
    determining if the voltage of the battery is below a minimum threshold value;
        based on determining that the voltage level is below the minimum threshold value, activating an internal combustion engine and monitoring the voltage of the battery and an operational state of the internal combustion engine;
    determining whether the operational state of the internal combustion engine is a steady state charging mode or the operational state of the internal combustion engine is not the steady state charging mode;
        based on determining that the operational state of the internal combustion engine is a steady state charging mode, adjusting at least one valve to provide exhaust gas from the internal combustion engine to a turbine; and
        based on determining that the operational state of the internal combustion engine is not the steady state charging mode, continuing to monitor the voltage of the battery and the operational state of the internal combustion engine.

6. The method of claim 5, further comprising:
based on determining that the operational state of the internal combustion engine is the steady state charging mode, ensuring that a clutched gear drive is engaged with the turbine such that a work output by the turbine is provided to the internal combustion engine.

7. The method of claim 5, further comprising:
based on determining that the operational state of the internal combustion engine is the steady state charging mode, monitoring the voltage of the battery and determining if the voltage of the battery is above to a maximum threshold value.

8. The method of claim 7, further comprising:
based on determining that the voltage level is above the maximum threshold value, deactivating the internal combustion engine.

9. The method of claim 8, further comprising:
based on determining that the voltage level is above the maximum threshold value, configuring the at least one valve such that exhaust gas from the internal combustion engine bypasses the turbine.

10. The method of claim 5, further comprising:
based on determining that the operational state of the internal combustion engine is not the steady state charging mode, configuring the at least one valve such that exhaust gas from the internal combustion engine bypasses the turbine.

11. A turbo compounding hybrid generator powertrain system comprising:
    an internal combustion engine system coupled to a generator, wherein the generator is configured to charge a battery;
    an electric motor configured to draw electrical power from the battery and provide mechanical power to a drive system;
    a controller configured to monitor a voltage level of the battery and responsively operate the internal combustion engine system and electric motor; and
    wherein the internal combustion engine system further comprises:
        an internal combustion engine;
        at least one valve operated by the controller for controlling a flow of an exhaust gas of the internal combustion engine;
        a turbine configured to selectively receive the exhaust gas from the internal combustion engine and to convert an exhaust energy into a mechanical power; and
        a clutched gear drive coupled to the turbine and the internal combustion engine, wherein the clutched gear drive is configured to provide the mechanical power generated by the turbine to the internal combustion engine;
            wherein when the internal combustion engine is operating in a steady state charging mode, the controller adjusts the at least one valve to direct the flow of the exhaust gas to the turbine; and wherein when the internal combustion engine is not operating in the steady state charging mode, the controller adjusts the at least one valve to direct the flow of the exhaust gas to bypass the turbine.

12. The turbo compounding hybrid generator powertrain system of claim 11, wherein the controller is further configured to selectively disengage the clutched gear drive from the turbine when the internal combustion engine is not operating in the steady state charging mode.

13. The turbo compounding hybrid generator powertrain system of claim 11, wherein the controller is further configured to selectively engage the clutched gear drive from the turbine when the internal combustion engine is operating in the steady state charging mode.

* * * * *